Nov. 25, 1952     H. T. ERICKSON     2,619,154
ADJUSTABLE SEAT CONSTRUCTION
Filed Nov. 9, 1950
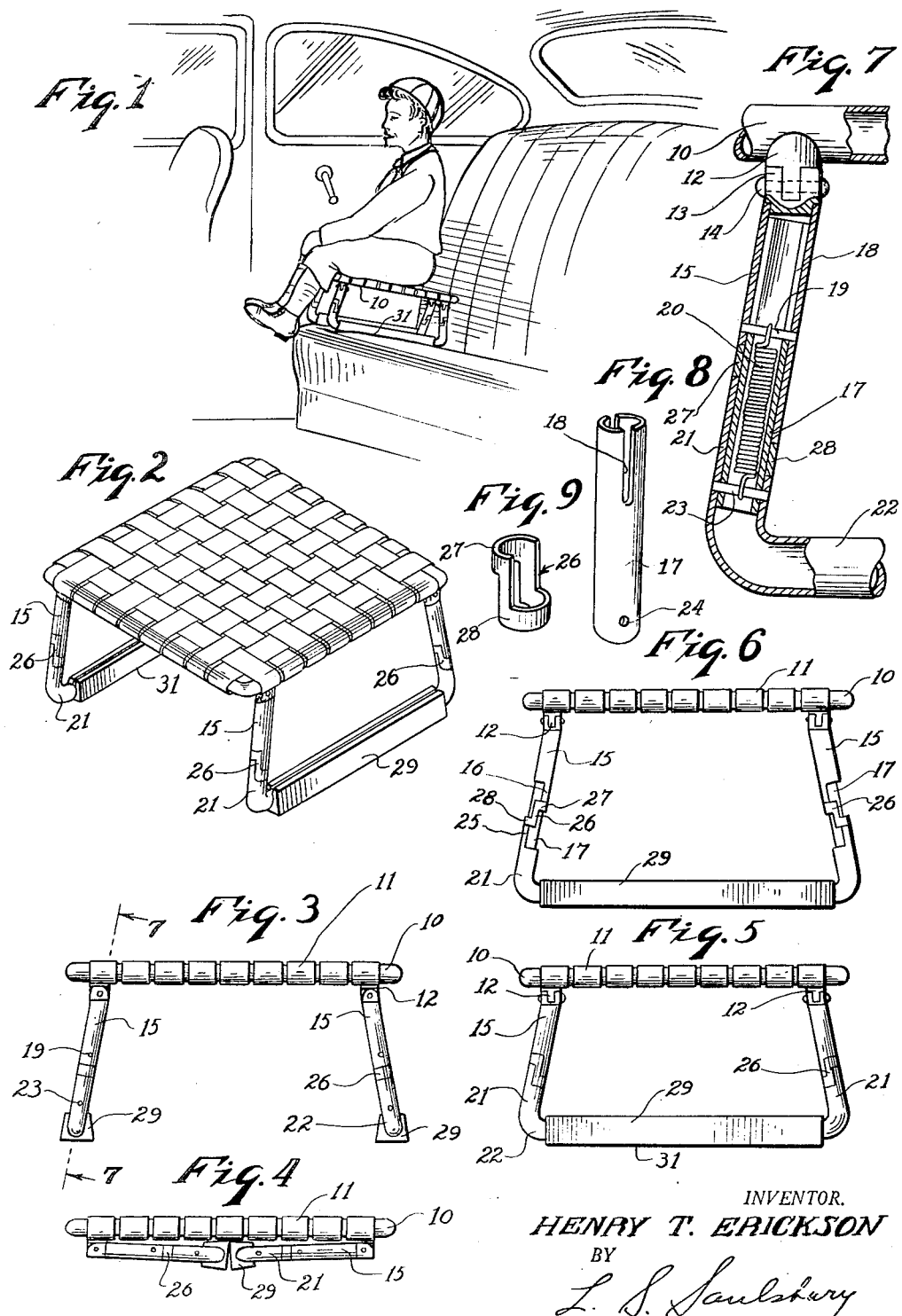
INVENTOR.
HENRY T. ERICKSON
BY
L. S. Saulsbury
ATTORNEY Patented Nov. 25, 1952

2,619,154

UNITED STATES PATENT OFFICE 2,619,154

ADJUSTABLE SEAT CONSTRUCTION

Henry T. Erickson, Cheyenne, Wyo.

Application November 9, 1950, Serial No. 194,749

3 Claims. (Cl. 155—88)

This invention relates to a child's adjustable seat.

It is an object of the present invention to provide a child's adjustable seat adapted for use in an automobile wherein the same can be adjusted to different heights depending upon the size of the child and wherein the child will be provided with a seat so that he may be elevated and ride in comfort in the automobile without the necessity of having to stand and run the risk of being thrown upon the automobile coming to a sudden stop.

It is another object of the invention to provide a stool which can be used to compensate for the small stature of children and which can not only be used in automobiles, but also at stadiums or grandstands, theaters and other like gathering places where the child needs to be elevated in order to see properly.

Other objects of the present invention are to provide an adjustable seat for children which is of simple construction, inexpensive to manufacture, has a minimum number of parts, easy to adjust to the different heights, of pleasing appearance, compact, durable, adapted to withstand hard use and efficient in operation.

For other objects and for a better understanding of the invention, reference may be had to the following detailed description taken in connection with the accompanying drawing, in which Fig. 1 is a perspective view of the child's seat resting on the rear seat of an automobile and in position of use.

Fig. 2 is an enlarged perspective view of the seat looking upon the top thereof.

Fig. 3 is an end elevational view of the seat.

Fig. 4 is an end elevational view of the seat with the supporting legs folded inwardly.

Fig. 5 is a side elevational view of the seat with the legs in their normal position.

Fig. 6 is a side elevational view of the seat with the respective legs extended.

Fig. 7 is an enlarged sectional view of one of the legs taken generally on line 7—7 of Fig. 3.

Fig. 8 is a perspective view of one of the leg parts.

Fig. 9 is a perspective view of the adjusting collar.

Referring now to the figures, 10 represents a top frame over which is extended a woven cover 11 made preferably of plastic strips which can be washed and cleaned. Depending from each side of the frame are spaced brackets 12 to which are respectively pivotally connected bifurcated blocks 13 by means of pivot pins 14.

Secured to each block 13 is a sleeve 15 having a cut away end portion 16. A sleeve 17 is slidably fitted within the sleeve 15 and has diametrically opposed longitudinally extending slots 18 open at their upper ends. A pin 19 extends across the slots through the sides of the sleeve 15. To this pin is secured a tension spring 20. Connected to the lower end of the slidable sleeve 17 is the upwardly bent end 21 of a U-shaped bottom member 22. This connection is effected through a pin 23 which passes through holes 24 in the slidable sleeve 17. The lower end of the tension spring 20 is connected to this pin 23. The upwardly bent end 21 of the U-shaped member 22 has a cut away portion 25 adapted to permit the upwardly bent end 21 to overlap the cut away portion 16 of sleeve 15.

An adjustable member 26 is rotatably connected to the sleeve 17 and is so shaped that when rotated to the position where its arcuate portions 27 and 28 are vertically aligned with the recesses of portions 15 and 21, in the manner shown in Figs. 5 and 7, the cut away portions 16 and 25 may overlap one another. If the adjustable member 26 is rotated to a position where the arcuate portions 27 and 28 respectively abut with the ends of the cut way portions of the sleeve 15 and bent end portion 21, the frame 10 and the seat covering will be held in an elevated position, as shown in Fig. 6. With the adjustable member so positioned on all of the legs, the seat part will be held wholly elevated. On each of the U-shaped members 22 there is fixed an elongated foot piece 29 having a flat bottom 31.

In order to lower the seat part, the adjustable members 26 are rotated so that the arcuate portions 27 and 28 thereof can be seated in the cut away recess of the sleeve 15 and the upwardly extending portion 21. The U-shaped members 22 and the parts connected therewith can be pivoted upon the brackets 12 and pivot pin 14 so that they can be folded upwardly underneath the seat part for the purpose of storage and transport and in the manner shown in Fig. 4.

The spring 20 will hold the parts together and the adjustable member 26 in its rotated position.

With the foot 29 being of rubber, a good footing is had. The leg assemblies are held against outward displacement by the engagement of the bifurcated portion with the bracket shoulders.

It will be seen that there has been provided a simple child's seat that can be adjusted readily to different heights and also can be easily adapted for use by the simple opening up of the leg assemblies. The leg arrangements can be readily adjusted to their retracted positions automatically by a simple rotation of the adjustable member 26. The tension spring 20 hooked about the upper and lower pins keeps the lower leg portions in position.

While various changes may be made in the detail construction, it shall be understood that such changes shall be within the spirit and scope of the present invention as defined by the appended claims.

What is claimed is:

1. An adjustable seat construction comprising a frame, leg brackets depending from said frame, upper sleeve elements respectively connected to said brackets, lower leg portions including projecting sleeves respectively slidably fitted in the upper sleeve elements, an adjustable member on each of the sleeve projections adjustable for rotation thereon, said sleeve element and said lower leg portion having respectively oppositely cut away ends adapted to normally overlap with one another, said adjustable member adapted to be normally within the overlapped cut away ends and having arcuate portions adapted upon being rotated and the lower leg portion being extended from the upper sleeve element to extend respectively under the cut away end of the sleeve element and over the cutaway end of the leg portion and spring means extending between the sleeve element and the leg portion to hold the lower leg portion in either of its adjusted positions.

2. A seat construction comprising a frame, a top cover extending over the frame, brackets depending from the frame, upper sleeve elements pivotally connected to said brackets to be folded inwardly, means cooperating between the brackets and the sleeve elements for effecting the pivotal connection thereof and for retaining the sleeve element in its outwardly pivoted position, a U-shaped foot member having leg portions with sleeve projections thereon slidably fitting respectively the sleeve elements at one side of the frame, said upper sleeve elements and said leg portions of the U-shaped member having respectively cut away ends permitting normally the overlap of the ends of the upper sleeve elements and the leg portions, an adjustable member rotatable upon each sleeve projection and having oppositely extending upper and lower arcuate portions and vertically extending spacing portions, said arcuate portions in one position of adjustment of the adjustable member lying within the cut away ends of the sleeve element and leg portion and in another angular position engaging with the cut away ends of the sleeve element and the leg portion of the U-shaped member and spring means extending between the sleeve element and the leg portion to keep the leg portion in position.

3. An adjustable leg construction comprising upper and lower leg elements, one of said elements having a sleeve projection slidably fitted into the other element, said upper and lower leg elements having respectively opposing cut away ends adapted to overlap with one another, an adjustable member on said sleeve projection having oppositely extending arcuate portions and interconnecting vertically extending portions, said adjustable member, when rotated to one position, lying within the cut away ends of the leg elements and when rotated to another position having its upper and lower arcuate portions engaging respectively with the cut away ends of the upper and lower leg elements and spring means extending between the upper and lower leg elements to keep the lower leg elements in their adjusted position and against downward displacement.

HENRY T. ERICKSON.

REFERENCES CITED

The following references are of record in the file of this patent:

UNITED STATES PATENTS

| Number | Name | Date |
|---|---|---|
| 1,030,658 | Gregory | June 25, 1912 |
| 1,645,683 | Beck | Oct. 18, 1927 |

FOREIGN PATENTS

| Number | Country | Date |
|---|---|---|
| 616,481 | France | Oct. 29, 1926 |
| 98,121 | Sweden | Feb. 20, 1940 |